United States Patent
Frost et al.

(10) Patent No.: US 11,078,938 B2
(45) Date of Patent: *Aug. 3, 2021

(54) CAPTIVE LOCATING SCREW

(71) Applicant: Carr Lane Manufacturing Co., St. Louis, MO (US)

(72) Inventors: Colin W. Frost, St. Louis, MO (US); Joshua M. Herschbach, Highland, IL (US); Raymond A. Okolischan, St. Louis, MO (US); Clifford M. Skeeters, St. Louis, MO (US); Tyler G. Schoon, Wood River, IL (US)

(73) Assignee: Carr Lane Manufacturing Co., St. Louis, MO (US)

( * ) Notice: Subject to any disclaimer, the term of this patent is extended or adjusted under 35 U.S.C. 154(b) by 173 days.

This patent is subject to a terminal disclaimer.

(21) Appl. No.: 16/506,445

(22) Filed: Jul. 9, 2019

(65) Prior Publication Data

US 2019/0331146 A1 Oct. 31, 2019

Related U.S. Application Data

(63) Continuation of application No. 15/467,334, filed on Mar. 23, 2017, now Pat. No. 10,393,159.

(51) Int. Cl.
*F16B 5/02* (2006.01)
*F16B 21/12* (2006.01)
*F16B 21/18* (2006.01)

(52) U.S. Cl.
CPC .............. *F16B 5/0208* (2013.01); *F16B 5/02* (2013.01); *F16B 21/12* (2013.01); *F16B 21/18* (2013.01)

(58) Field of Classification Search
CPC .......... F16B 5/02; F16B 5/0208; F16B 21/12; F16B 21/18; F16B 23/00; F16B 35/06
USPC ....... 411/352, 353, 356, 383, 396, 402, 409, 411/918
See application file for complete search history.

(56) References Cited

U.S. PATENT DOCUMENTS

| | | |
|---|---|---|
| 2,761,484 A | 9/1956 | Sternick et al. |
| 2,851,079 A | 9/1958 | Heller |
| 3,425,473 A | 2/1969 | Knowlton |
| 3,437,119 A | 4/1969 | Dey |
| 3,659,491 A | 5/1972 | Duffy et al. |
| 3,820,199 A | 6/1974 | Popper et al. |
| 4,132,145 A | 1/1979 | Becker |
| 5,017,068 A | 5/1991 | Cooksey |
| 5,080,269 A | 1/1992 | Larsson et al. |
| 5,498,183 A | 3/1996 | Riviera |
| 6,079,179 A | 6/2000 | Shoemaker, Jr. |
| 6,290,442 B1 | 9/2001 | Peterkort |
| 7,082,664 B2 | 8/2006 | Powers et al. |

(Continued)

*Primary Examiner* — Roberta S Delisle
(74) *Attorney, Agent, or Firm* — Lewis Rice LLC

(57) ABSTRACT

A captive locating screw system comprising a captive locating screw assembly configured for use with a bushing assembly. The captive locating screw assembly has a gripping means attachable to be threaded shaft or stud and an optional protecting means disposed between the gripping means and the body of the shaft. The protecting means may be a washer or other similar structure, and remains statically in contact with a workpiece or work surface, to reduce damage or marring, even as the captive locating screw assembly is rotated by twisting the gripping means to fasten it to the workpiece or work surface.

20 Claims, 6 Drawing Sheets

(56) References Cited

U.S. PATENT DOCUMENTS

| | | | |
|---|---|---|---|
| 7,156,598 B2 * | 1/2007 | Tibbenham | F16B 19/02 16/430 |
| 9,291,654 B2 | 3/2016 | Lemay | |
| 9,840,296 B2 | 12/2017 | Laurenzo | |
| 2010/0025559 A1 | 2/2010 | Rathbone et al. | |
| 2015/0369272 A1 | 12/2015 | Hohmann, Jr. | |
| 2018/0236591 A1 | 8/2018 | Heimann et al. | |
| 2019/0032689 A1 | 1/2019 | Beardmore et al. | |

* cited by examiner

CAPTIVE LOCATING SCREW

CROSS-REFERENCE TO RELATED APPLICATIONS

This application is a continuation of U.S. patent application Ser. No. 15/467,334, filed Mar. 23, 2017, the entire disclosure of which is incorporated herein by reference.

BACKGROUND OF THE INVENTION

Field of the Invention

This disclosure is related to the field of machining, and more particularly to a captive locating screw for precision machining.

Description of the Related Art

Manufacturing processes almost always require that a number of component parts to the finished product are separately constructed and then assembled into the final finished product. This basic process has been used for millennia to assemble a complex device from simple component pieces. Whether in woodworking, cabinetry, or metalworking, there is a need both to hold a workpiece in place and to hold multiple workpieces together. Additionally, particularly with machining operations, a workpiece may need to be held in place for machining at a very specific and precise position. It is well known in manufacturing that the quality of machining depends greatly on the precision of the operations, which in turn requires that the workpiece be positioned with respect to the machining equipment very precisely and within accepted manufacturing tolerances.

In many circumstances, it is desirable to hold two different workpieces into a fixed alignment. This may be because, for example, a bore must be drilled through both pieces in precision alignment so that the pieces will match up later in assembly. Holes and other features may need to be aligned and coordinated among individual workpieces with great precision to insure proper assembly and function at a later point in time.

Prior art solutions to this problem used a combination of grid boards with precision holes or bores drilled into them at defined intervals, and locating screws or studs which could be inserted into the grid bores and fastened in place to insure that successive workpieces, or multiple workpieces, are positioned in exactly the same manner for machining. This allows, for example, a machining operation to be set up, and then performed on multiple successive workpieces in exactly the same manner, by insuring that the workpieces are also disposed in the nearly identical position on the grid board.

Existing solutions to this problem suffer from a number of defects. For one, most solutions to hold pieces in place are difficult to use because they effectively require three hands: one hand to hold the workpiece in place, one hand to hold the fastener in place, and a third hand to manipulate a tool to attach the fastener to the workpiece. This often results in the frustrating situation where the worker must remove one hand from holding either the workpiece or fastener, which can result in either the workpiece or the fastener slipping from the desired position.

This in turn requires restarting the whole process of aligning the components, resulting in annoyance and wasted time. Additionally, the holding mechanism preferably should not scratch or mar the work surface. This makes rotating attachments difficult to implement because the rotation of the fastener will almost always scratch or otherwise damage the surface of the workpiece.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a captive locating screw assembly comprising: a shaft generally in the configuration of an elongated cylinder, the shaft comprising: a threaded portion disposed at a first end of said shaft; an attaching portion disposed at a second end of said shaft opposing the first end, the attaching portion having an attaching bore radially disposed therein; a body portion extending between the threaded portion and the attaching portion; and a handle configured to be twisted by a human hand, the handle having attached thereto a sleeve portion generally in the configuration of a cylinder, the sleeve portion having a radial bore radially disposed therein and a ventral bore ventrally disposed therein; wherein the attaching bore and the grip bore are configured such that, when the attaching portion is inserted into the ventral bore, the shaft may be rotated to align the attaching bore and the radial bore generally linearly.

In an embodiment, the body portion is generally smooth and has a radius larger than the radius of the attaching portion.

In another embodiment, the threads of the threaded portion have a radius about the same as the radius of the body portion.

In another embodiment, the threads of the threaded portion have a radius greater than the radius of the attaching portion.

In another embodiment, the central axis of the attaching bore is generally perpendicular to the central axis of the shaft.

In another embodiment, the central axis of the attaching bore intersects the central axis of the shaft.

In another embodiment, the handle comprises a central body having a plurality of protrusions attached to a periphery thereof.

In another embodiment, the handle and the sleeve portion are generally coaxial.

In another embodiment, the radial bore is generally parallel to the attaching bore.

In another embodiment, the radial bore intersects the ventral bore.

In another embodiment, the radial bore is generally perpendicular to the ventral bore.

In another embodiment, the assembly further comprises a fastener configured for insertion through the radial bore and into the attaching bore when the attaching portion is inserted into the ventral bore, and the radial bore and the attaching bore are aligned generally linearly.

In another embodiment, the attaching portion is inserted into the ventral bore such that the attaching bore and the radial bore are generally linearly aligned, and the fastener is inserted through the attaching bore and the radial bore and fastens the shaft to the handle.

In another embodiment, the fastener is a roll pin.

In another embodiment, the assembly further comprises a washer having an axial washer bore, the washer bore sized and shaped for the attaching portion to be inserted therethrough.

In a further embodiment, the attaching portion is inserted through the washer bore and into the ventral bore such that the attaching bore and the radial bore are generally linearly aligned and the fastener is inserted through the attaching bore and the radial bore to fasten the shaft to the handle, and the washer is held between the sleeve portion and the body portion.

In another embodiment, the washer spins independently of the shaft and the handle.

Also described herein, among other things, is a captive locating screw assembly comprising a shaft generally in the configuration of an elongated cylinder, the shaft having a threaded portion and an attaching portion disposed at opposing ends with a body portion extending therebetween, the shaft having a gripping means attached to the attaching portion and a protecting means disposed on the shaft.

In an embodiment, the protecting means moves independently of the shaft and the gripping means Also described herein, among other things, is a method for holding a work piece comprising: providing a work surface having at least one threaded receiving bore; providing a work piece having at least one through bore; providing a captive locating screw assembly comprising a shaft having a first threaded end and a gripping means and protecting means attached to the shaft at an opposing second end of said shaft; providing a bushing assembly configured to accept the captive locating screw assembly, the bushing assembly having a locking means; aligning axially the through bore and the receiving bore; seating the bushing assembly in the through bore; using the gripping means, screwing the captive locating screw assembly into the receiving bore through the bushing assembly in the through bore; and locking the captive locating screw assembly to the bushing assembly with the locking means.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

At a high level, the captive locating screw system described herein comprises up to two primary components: (1) a captive locating screw assembly; and (2) a bushing assembly. Generally speaking, the bushing assembly comprises a bushing head with an attached sleeve configured for insertion into a bore, and the captive locating screw assembly comprises a precision shaft, washer, and a rotating grip or knob. These and other components are described in further detail elsewhere in this disclosure.

Figure 1:
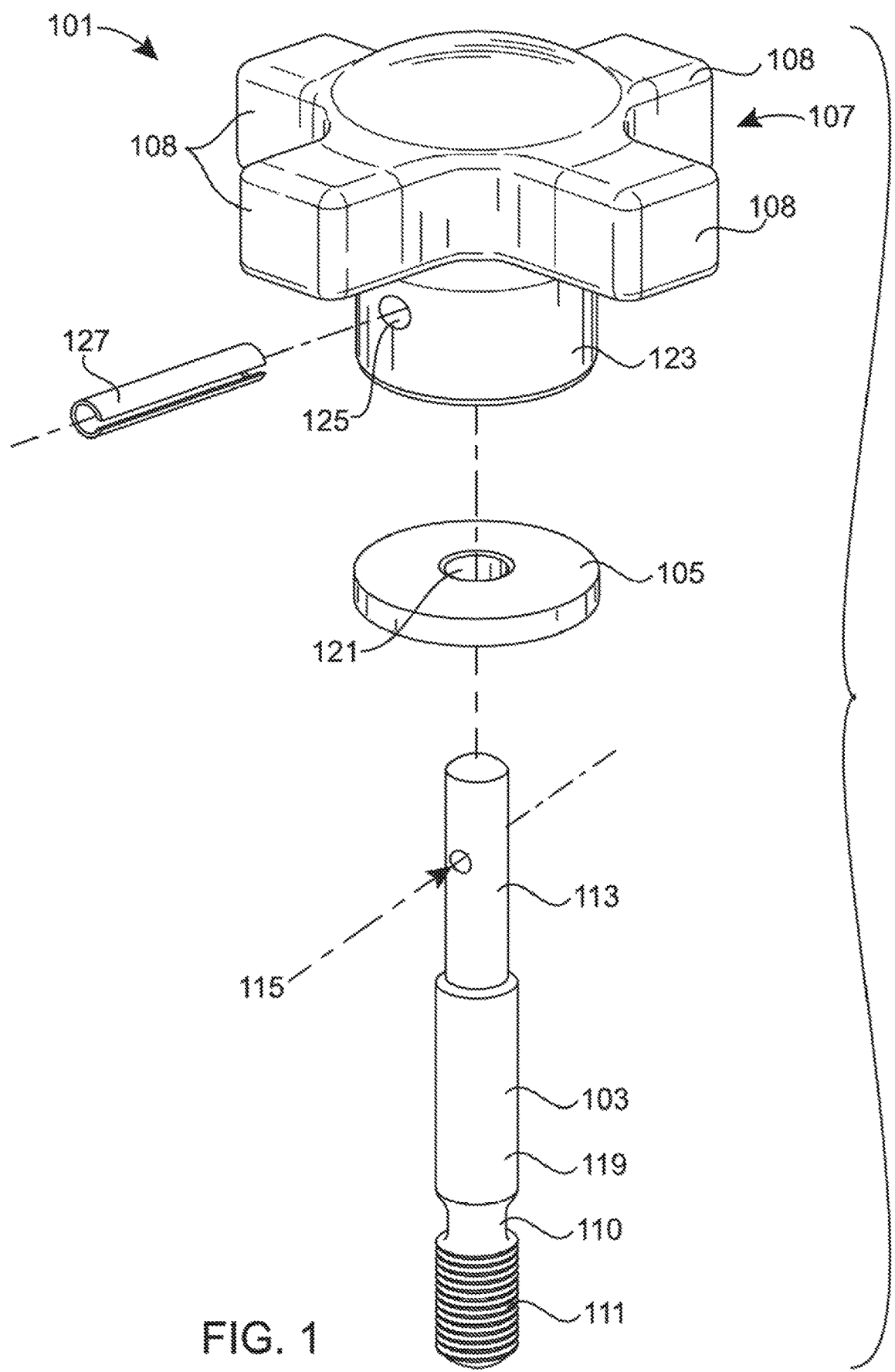
FIG. 1 depicts an exploded view of a captive locating screw system according to the present disclosure.

FIG. 1 depicts an embodiment of a captive locating screw system 101 according to the present disclosure. The depicted captive locating screw system 101 comprises a shaft element 103, a protective means 105 for preventing marring of the workpiece surface (in the depicted embodiment of FIG. 1, a washer 105), and a gripping means 107 (depicted in FIG. 1 as a rotatable handle 107).

The depicted shaft element 103 of FIG. 1 is generally in the configuration of an elongated cylinder, and comprises three sections 111, 113, and 119. The depicted shaft element 103 comprises a threaded portion 111 and an attaching portion 113, with a body portion 119 disposed therebetween. The threaded portion 111 is disposed at one end of the shaft element 103 and the attaching portion 113 is disposed at the opposing end of the shaft element 103, with the body portion 119 disposed in the middle of the shaft element 103.

As can be seen in the FIG. 1, the circumferential dimensions of the shaft element 103 vary along its length. In the depicted embodiment of FIG. 1, this is due to, among other things, differences between the configurations of the component portions 111, 113, and 119. In the depicted embodiment of FIG. 1, the body portion 119 has a larger radius than the attaching portion 113, and the threaded portion 111 has a larger radius than the attaching portion 113. In the depicted embodiment of FIG. 1, the radius of the threads of the threaded portion 111 is about the same as the radius of the body portion 119. In alternative embodiments, the radius of the threaded portion 111 could be greater than the radius of the body portion 119, or vice versa. In another embodiment, the radius of the threaded portion 111 could have a smaller radius than the attaching portion 113.

Disposed between the threaded portion 111 and the body portion 119 is a recessed portion 110 having a smaller radius than either the threaded portion 111 or the body portion 119. As explained elsewhere herein, this recessed portion 110 is configured to engage in a locking relationship with the lock pin 203 of the bushing assembly 201. The position of the recessed portion 110 along the length of the shaft element 103 may vary from embodiment to embodiment, but is generally configured to correspond to the position of the locking pin 203 in the bushing assembly 201 when the captive locating screw system 101 is assembled, as described elsewhere herein.

The depicted body portion 119 comprises a generally smooth, circumferential surface, consistent in radius and shape, for clean insertion into the bushing bore 109, as described elsewhere in this disclosure. The attaching portion 113 functions to attach the shaft element 103 to the gripping means 107 and, where used, the protecting means 105. In the depicted embodiment of FIG. 1, the shaft element 103 is attached to the gripping means 107 via a pin 127 or roll pin 127. The depicted pin 127 is a generally elongated cylindrical element and may be a closed cylinder or a roll pin 127.

As can be seen in FIG. 1, the attaching portion 113 comprises a shaft bore 115 partially or fully therethrough. The depicted shaft bore 115 is generally in a cylindrical configuration, and its radial axis is generally perpendicular to the radial axis of the shaft element 103. In the depicted embodiment of FIG. 1, the radial axis of the bore 115 also intersects the center radial axis of the shaft element 103. Other configurations are of course possible, including differently sized or shaped bores, and/or bores disposed in a different geometric relationship to the shaft element 103. The particular disposition and configuration in an embodiment will depend upon the geometry of all of the component pieces and how they are designed to interact and/or interconnect.

The depicted gripping means 107 is a molded handle having one or more protrusions 108 arranged around the periphery of the handle, which protrusions 108 are configured for easy, comfortable, and tight grasping by a human hand or fingers. In the depicted embodiment of FIG. 1, the one or more protrusions 108 comprise four protrusions 108, but any number of protrusions 108 is possible, including no protrusions. Besides protrusions, other configurations known to those of skill in the art may be used in an embodiment to facilitate gripping and rotating. The depicted gripping means 107 is designed to be rotated about a central axis of the gripping means 107. The depicted gripping means 107 has a central axis disposed generally perpendicularly to the major lateral plane of the gripping means 107. The depicted gripping means 107 has a top end, near which the protrusions 108 are disposed, and an opposing bottom end.

Figure 2:
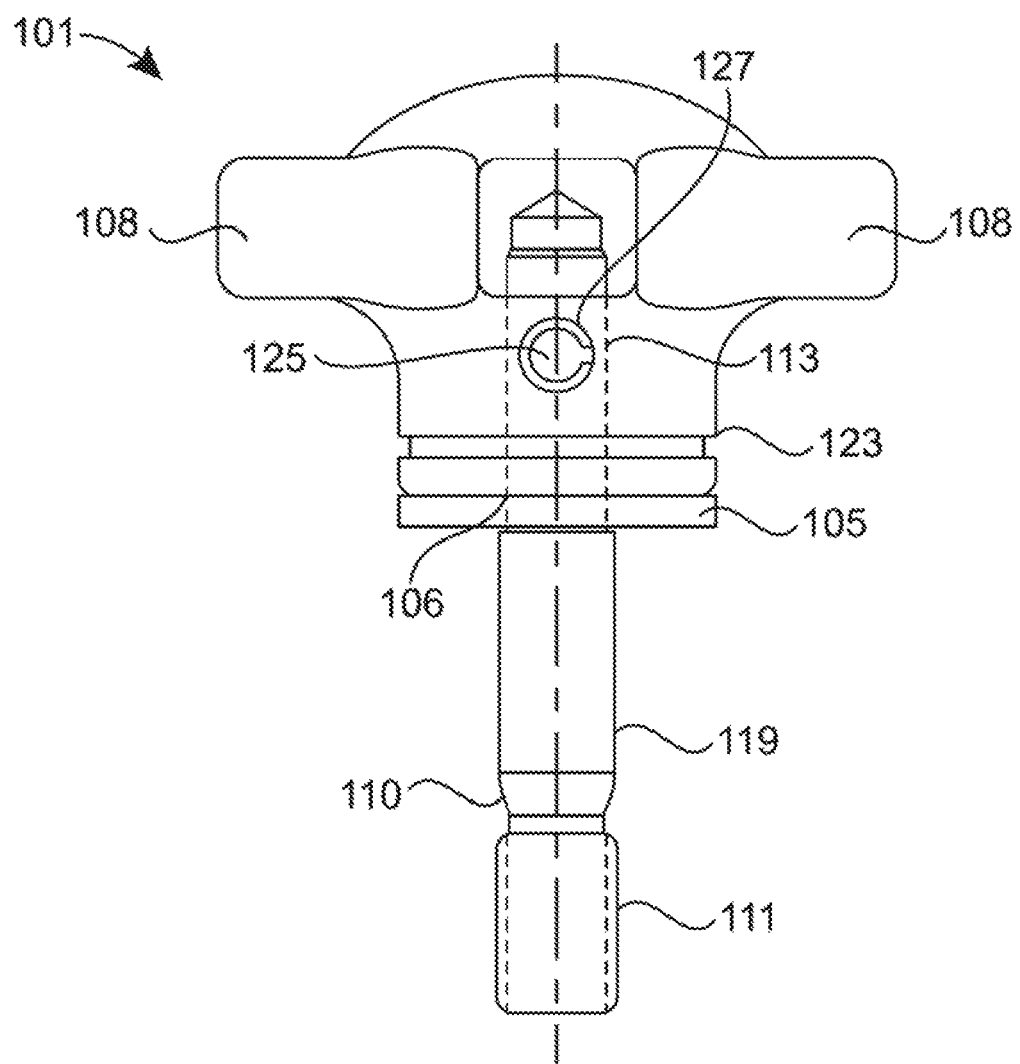
FIG. 2 depicts a side elevation view of a captive locating screw system according to the present disclosure.

The depicted gripping means 107 further comprises a bore or grip bore 106 at the bottom end, as shown in the exemplary embodiment of FIG. 2. The depicted bore 106 extends into the body of the gripping means 107 and terminates at a point partway towards the top end of the gripping means 107. Although the depicted gripping means 107 does not have a through bore 106, such a structure is possible, as would be recognized by one of skill in the art. The depicted gripping means 107 further comprises a sleeve portion 123 generally in the configuration of a short cylinder coaxially attached to the gripping means 107. The depicted gripping means 107 and sleeve portion 123 may be formed of a singular contiguous and monolithic piece as depicted in FIG. 1, or may be separately formed and later assembled.

To assemble the shaft element 103 and gripping means 107, the attaching portion 113 of the shaft element 103 is inserted into the bore 106 in the gripping means 107. One of ordinary skill will understand that the size and shape of the bore 106 in the gripping means 107 is configured to accommodate the attaching portion 113 of the shaft element 103. It is preferable that this fit be snug, meaning it permits little or no lateral movement of the attaching positioning in the bore 106, but not so tight as to require a significant force. In the depicted embodiment of FIG. 1 and also shown in FIG. 2, the bore 106 in the gripping means 107 begins at the bottom of the sleeve portion 123. The depicted bore 106 is generally coaxial with the central axis of the gripping means 107, and also coaxial with a central axis of the sleeve portion 123.

The sleeve portion 123 depicted in FIG. 1 further comprises a sleeve bore 125 disposed at least partially, and optionally fully, therethrough. As with shaft bore 115, the sleeve bore 125 may be of any configuration, and is depicted as a generally cylindrical bore. The sleeve bore 125 is sized and shaped to accept the pin 127, preferably in a snug fit to inhibit movement. The sleeve bore 125 is positioned on the sleeve portion 123 such that, when the shaft element 103 is inserted into the grip bore 106, the shaft bore 115 and the attaching portion 113 can be aligned to the sleeve bore 125. This alignment may require the shaft element 103 to be inserted into the grip bore 106, and then rotated until bores 115 and 125 are generally linearly and coaxially aligned. The pin 127 may then be inserted into the sleeve bore 125, and then pass through the shaft bore 115, effectively holding the shaft element 103 and gripping means 107 together in an assembly. Although a pin 127 is depicted for mating the shaft element 103 and gripping means 107, other attaching means are known in the art and may be used instead.

In an embodiment, the grip bore 106 and shaft element 103 may be configured such that the shaft element 103, when inserted to the full depth of the grip bore 106 (meaning the top of the attaching portion of 113 contacts the terminal end of the grip bore 106 distal from the opening), will come to rest in a position where bores 115 and 125 are aligned (meaning their respective central axes are generally coplanar). Alternatively, the diameter of the grip bore 106 may be such that the shaft element 103 cannot be inserted any further than to the top of the body portion 119. That is, the diameter of the grip bore 106 is slightly larger than the diameter of the attaching portion 113 but smaller than the diameter of the body portion 119. The position of bores 125 and 115 may then be configured on their respective components so that, when shaft element 103 is inserted into grip bore 106, shaft element 103 is stopped by the larger diameter of the body portion 109 in a position where bores 115 and 125 are aligned.

In an embodiment, including the embodiment depicted in FIG. 1, the captive locating screw system 101 may further comprise a protecting means 105. The protecting means 105 is a structure for preventing damage, scarring, scratching, or other marring of the surface of a workpiece when the captive locating screw system 101 is rotated. In the depicted embodiment, the protecting means 105 is a washer 105. The depicted washer 105 is a flat, cylindrical element having a bore 121 therethrough, the bore 121 being disposed coaxially in the washer 105 with the washer's central axis. Generally, the diameter of the washer bore 121 and grip bore 106 are about the same. In the depicted embodiment, the diameter of washer bore 121 is such that the attaching portion 113 passes through washer bore 121. The fit is snug but loose enough that the washer 105 can easily rotate around the attaching portion 113. In the depicted embodiment of FIG. 1, the diameter of the washer 105 is larger than that of grip bore 106. The washer 105 is added to the assembled captive locating screw system 101 by aligning the washer bore 121 with the grip bore 106 and inserting the attaching portion 113 through the washer bore 121 and then into the grip bore 106. This effectively traps the washer 105 between the bottom of the gripping means 107 (the bottom of the sleeve portion 123 in the depicted embodiment) and the top end of the body portion 119. This is because the diameter of the body portion 119 is slightly larger than the diameter of the washer bore 121 (and the grip bore 106).

In an embodiment including a washer 105, the fit between the gripping portion 107 and the shaft element 103 should be loose enough that the washer 105 can rotate about the attaching portion 113. This allows the washer 105 to be disposed statically with respect to a workpiece even while the gripping means 107 and shaft element 103 turn. This inhibits damage to the workpiece. This functionality works because, when the gripping means 107 is twisted, the attachment between the gripping means 107 and the shaft element 103 (via the pin 127 in the depicted embodiment)

forces the shaft element 103 to rotate with the gripping means 107. However, because the washer 105 can rotate independently of the gripping means 107 and the shaft element 103, the washer can also not rotate with respect to the workpiece even while the gripping means 107 and shaft element 103 do rotate. As evident to one of ordinary skill in the art, the various components may further be dimensioned to accommodate the presence of the washer 105 such that bores 115 and 125 are aligned when all three components, 103, 105, and 107, are assembled.

Figure 3:
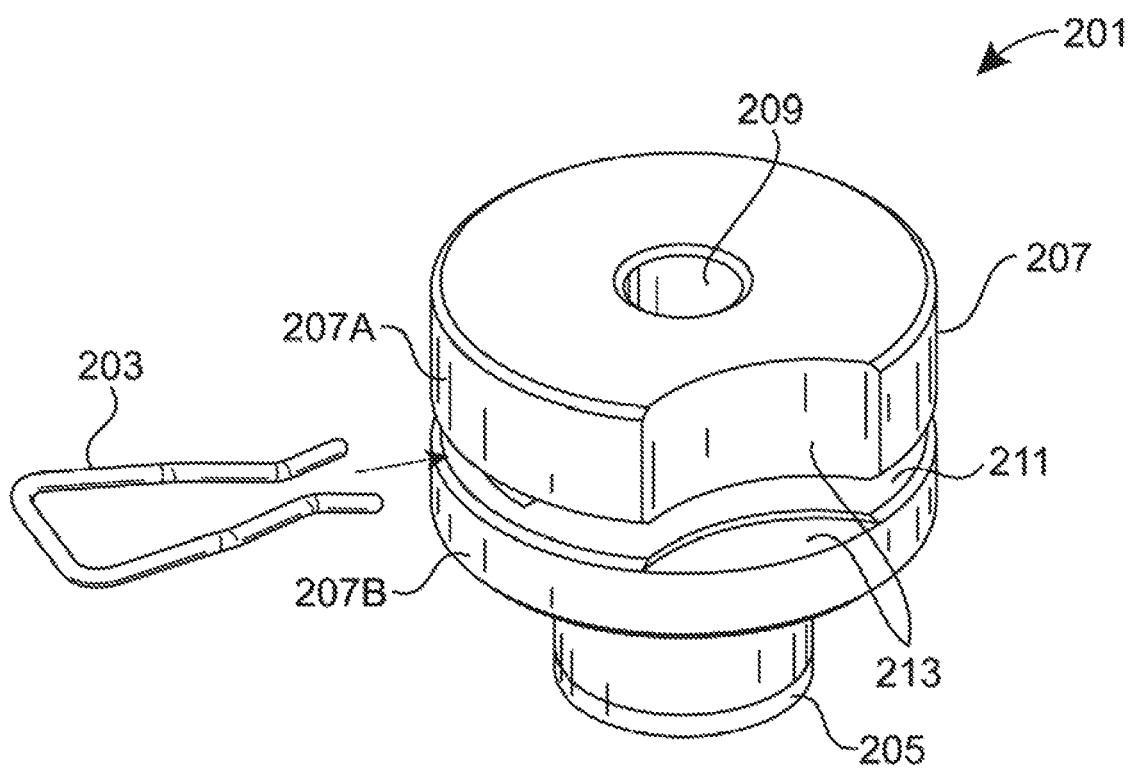
FIG. 3 depicts an isometric view of a bushing for use in a captive locating screw system according to the present disclosure.
Figure 4:
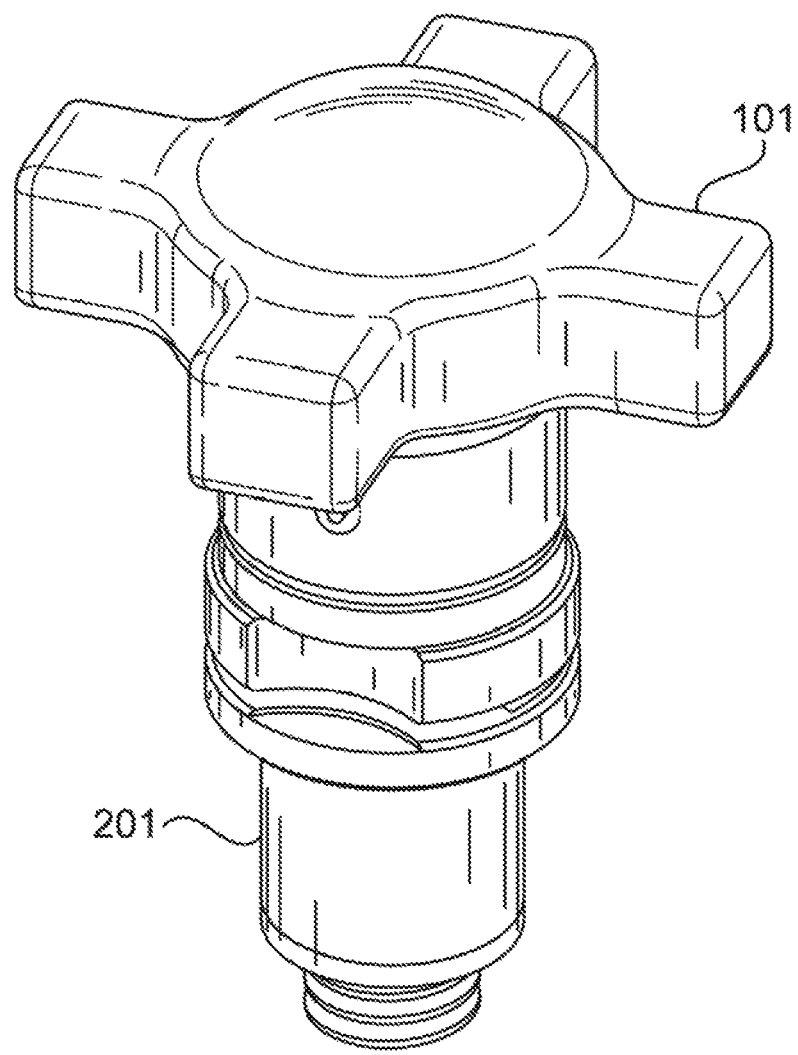
FIG. 4 depicts an isometric view of a captive locating screw system according to the present disclosure.
Figure 5:
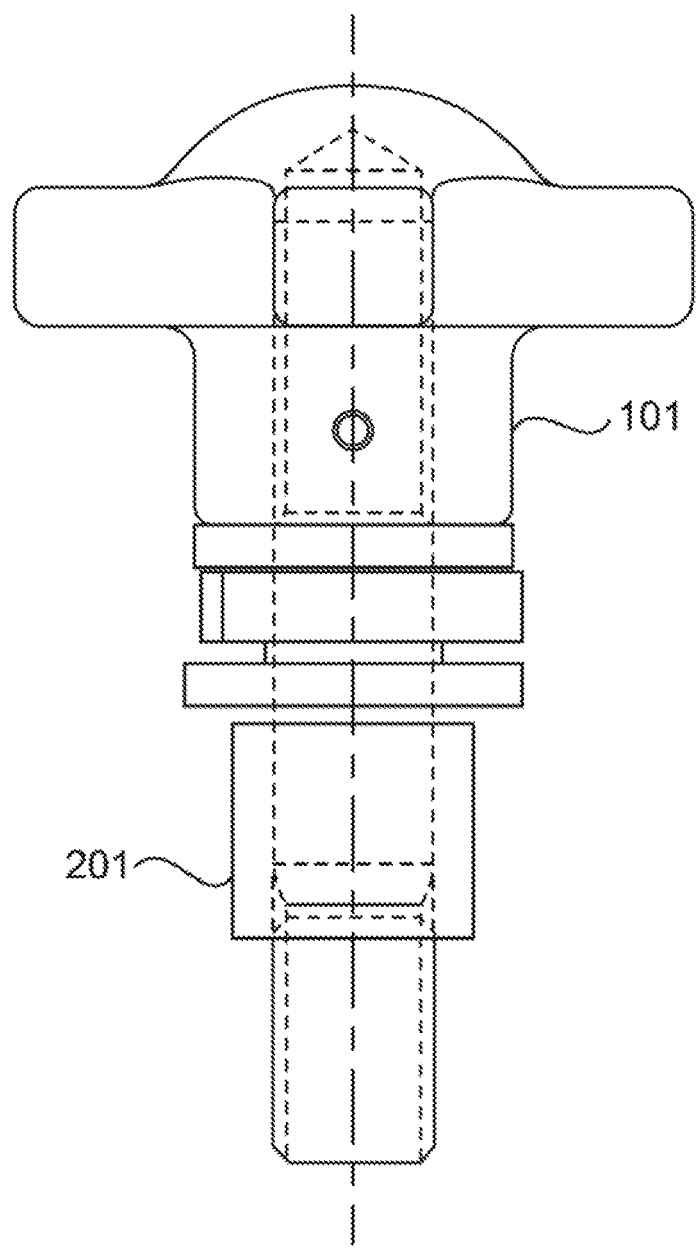
FIG. 5 depicts a side elevation view of a captive locating screw seated in a bushing according to the present disclosure.

With respect to FIG. 3, an embodiment of a bushing assembly 201 for use with the captive locating screw system 101 of FIG. 1 is depicted. In the depicted embodiment of FIG. 3, the bushing assembly 201 comprises a precision sleeve 205 attached to a bushing head 207 and a locking means 203. As will be understood by one of ordinary skill in the art, a bushing 201 is generally a metal sleeve inserted into a bore, which protects the interior surface of the bore and provides a seating for a pin, dowel, or other object to be inserted therein.

The depicted bushing assembly 201 has a locking pin 203 for a locking means 203, which holds an inserted pin, dowel, or other object in place. In the depicted embodiment of FIG. 3, a bore 209 is centrally and axially disposed through the bushing 201 from a top side to an opposing bottom side. The depicted bore 209 is generally coaxial with a central axis of the bushing assembly 201. The locking pin 203 is sized and shaped to clamp onto the shaft element 103 inserted into the bore 209 when the locking pin 203 is inserted into the bushing recess portion 211. The bore 209 is further sized and shaped to accommodate the radius of shaft element 103 at its widest point. In the depicted embodiment of FIG. 1, for example, the widest point of the shaft element 103 is the threaded portion 111 and the main body portion 119. The depicted head portion 209 is larger in radius than the sleeve portion 205. In the depicted embodiment of FIG. 3, the head portion 207 further comprises an annular or disc-shaped recess portion 211 configured to accept the locking pin 203 inserted laterally. The recessed portion 211 is generally in the configuration of a flat cylinder of omitted material coaxial with the bushing head 207. The recess portion 211 logically separates the bushing head 207 into two halves 207A and 207B connected near the bore 209 by a column of material that does not completely surround the bore 209. This facilitates the locking function of the locking pin 203.

Although the term halves is used, as can be seen in FIG. 3, the two halves 207A and 207B are not necessarily geometric halves, meaning they are not equally sized pieces of the whole, and may have differing heights. The depicted bushing head 207 is generally cylindrical in configuration. The depicted bushing head 207 further includes a cutaway portion 213 at the radial periphery of the bushing head 207. This cutaway portion 213 may be configured in an embodiment so that the locking pin 203, when installed, can be gripped and removed easily. The cutaway portion 213 may also, or alternatively, be configured in an embodiment to accept the head of a second screw 601, as shown and described with respect to FIG. 6 to hold the bushing 201 in place. The resulting appearance of the bushing head 207 is of a C-shape, or, more colloquially, a cookie with a bite out of it. It should be noted that this cutout 213 may be in both the top 207A and bottom 207B halves of the bushing head 207 in whole or part, or in one or the other, in whole or part. In the depicted embodiment, the cutout 203 is through the entire top half 207A and only part of the bottom half 207B.

Figure 6:
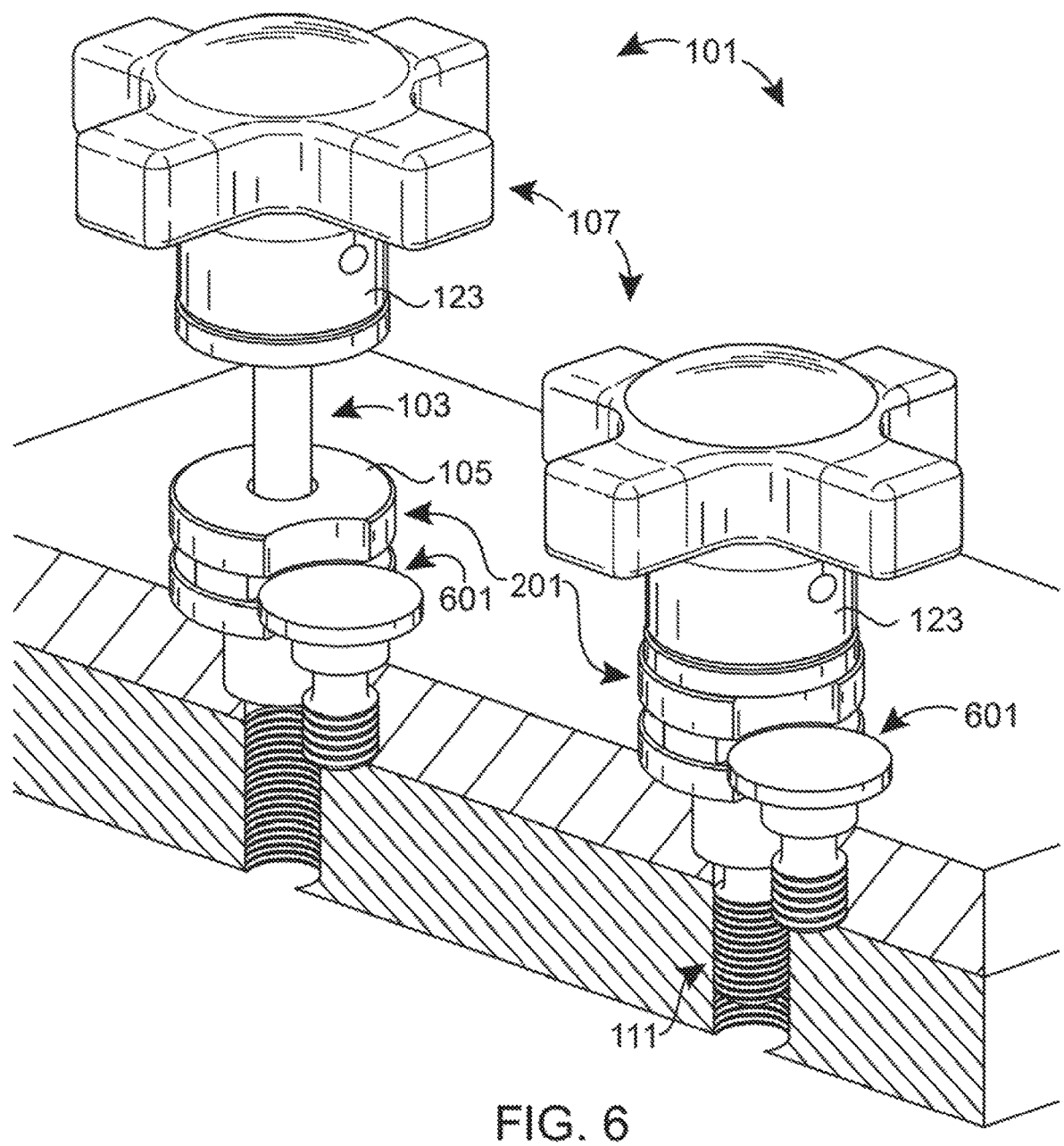
FIG. 6 depicts an isometric cutaway view of a captive locating screw seated in a bushing and installed in a workpiece according to the present disclosure.

As depicted in the embodiment of FIG. 6, to assemble and use the captive locating screw system 101, the bushing assembly 201 is placed into the work bore, such as on a workpiece, workbench, or other work surface or apparatus, and the workpiece is aligned with either another workpiece or the work surface. The captive locating screw system 101 is assembled as described elsewhere herein, and inserted thread-first into the bore 209 of the bushing assembly 201, meaning that the threaded portion 111 is inserted into the bushing bore 209. The captive locating screw system 101 is pushed down into the bore 209 until the threaded portion 111 contacts the bottom of the workpiece or work table (or a corresponding receiving thread system), at which point the gripping means 107 is manually rotated. This in turn rotates the shaft element 103, causing the threads of the threaded portion 111 to engage with the corresponding receiving threaded portion. The captive locating screw system 101 is tightened until the workpiece is held firmly in place. The washer 105 provides a buffer between the top of the workpiece and the rotating motion of the gripping means 107. That is, when washer 105 connects to the workpiece, the rotation of gripping means 107 does not also rotate the washer 105, protecting the finish of the workpiece. A second screw 601 may be rotated into an adjacent bore, with the head of the second screw 601 to hold the bushing 201 in place, as shown in the depicted embodiment of FIG. 6.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A captive locating screw assembly comprising:
    a shaft comprising a threaded portion and an opposing attaching portion, and having a body extending therebetween, said attaching portion having an attaching bore;
    a handle having a sleeve portion, said sleeve portion having a radial bore and a ventral bore; and
    a fastener;
    wherein said attaching portion is inserted into said ventral bore such that said attaching bore and said radial bore are generally linearly aligned, and said fastener is inserted through said attaching bore and said radial bore and fastens said shaft to said handle.

2. The assembly of claim 1, wherein said body is generally smooth and has a radius larger than the radius of said attaching portion.

3. The assembly of claim 1, wherein the threads of said threaded portion have a radius about the same as the radius of said body.

4. The assembly of claim 1, wherein the threads of said threaded portion have a radius greater than the radius of said attaching portion.

5. The assembly of claim 1, wherein the central axis of said attaching bore is generally perpendicular to the central axis of said shaft.

6. The assembly of claim 1, wherein the central axis of said attaching bore intersects the central axis of said shaft.

7. The assembly of claim 1, where said handle comprises a central body having a plurality of protrusions attached to a periphery thereof.

8. The assembly of claim 1, wherein said protrusions are configured for twisting by a human hand.

9. The assembly of claim 1, wherein said handle and said sleeve portion are generally coaxial.

10. The assembly of claim 1, wherein said radial bore is generally parallel to said attaching bore.

11. The assembly of claim 1, wherein said radial bore intersects said ventral bore.

12. The assembly of claim 1, wherein said radial bore is generally perpendicular to said ventral bore.

13. The assembly of claim 1, wherein said fastener is a roll pin.

14. The assembly of claim 1, further comprising a washer having an axial washer bore, said washer bore sized and shaped for said attaching portion to be inserted therethrough.

15. The assembly of claim 14, wherein said attaching portion is inserted through said washer bore and into said ventral bore such that said attaching bore and said radial bore are generally linearly aligned and said fastener is inserted through said attaching bore and said radial bore to fasten said shaft to said handle, and said washer is held between said sleeve portion and said body portion.

16. The assembly of claim 15, wherein said washer spins independently of said shaft and said handle.

17. The assembly of claim 1 in a captive locating screw system further comprising a bushing assembly configured to accept said captive locating screw assembly.

18. The system of claim 17, wherein said bushing assembly further comprises a locking means.

19. The system of claim 18, wherein said captive locating screw assembly is locked to said bushing assembly with said locking means.

20. A method for holding a work piece comprising:
providing a work surface having at least one threaded receiving bore;
providing a work piece having at least one through bore;
providing a captive locating screw assembly comprising:
    a shaft comprising a threaded portion and an opposing attaching portion, and having a body extending therebetween, said attaching portion having an attaching bore;
    a handle having a sleeve portion, said sleeve portion having a radial bore and a ventral bore;
providing a bushing assembly configured to accept said captive locating screw assembly, said bushing assembly having a locking means;
assembling said captive locating screw assembly by:
    inserting said attaching portion into said ventral bore such that said attaching bore and said radial bore are generally linearly aligned; and
    inserting said fastener through said attaching bore and said radial bore to fastens said shaft to said handle;
aligning axially said through bore and said receiving bore;
seating said bushing assembly in said through bore;
using said gripping means, screwing said assembled captive locating screw assembly into said receiving bore through said bushing assembly in said through bore; and
locking said captive locating screw assembly to said bushing assembly with said locking means.

\* \* \* \* \*